Nov. 24, 1942.    L. GOODMAN    2,303,043
DITCHER ATTACHMENT FOR TRACTORS
Filed Sept. 22, 1941    4 Sheets-Sheet 1
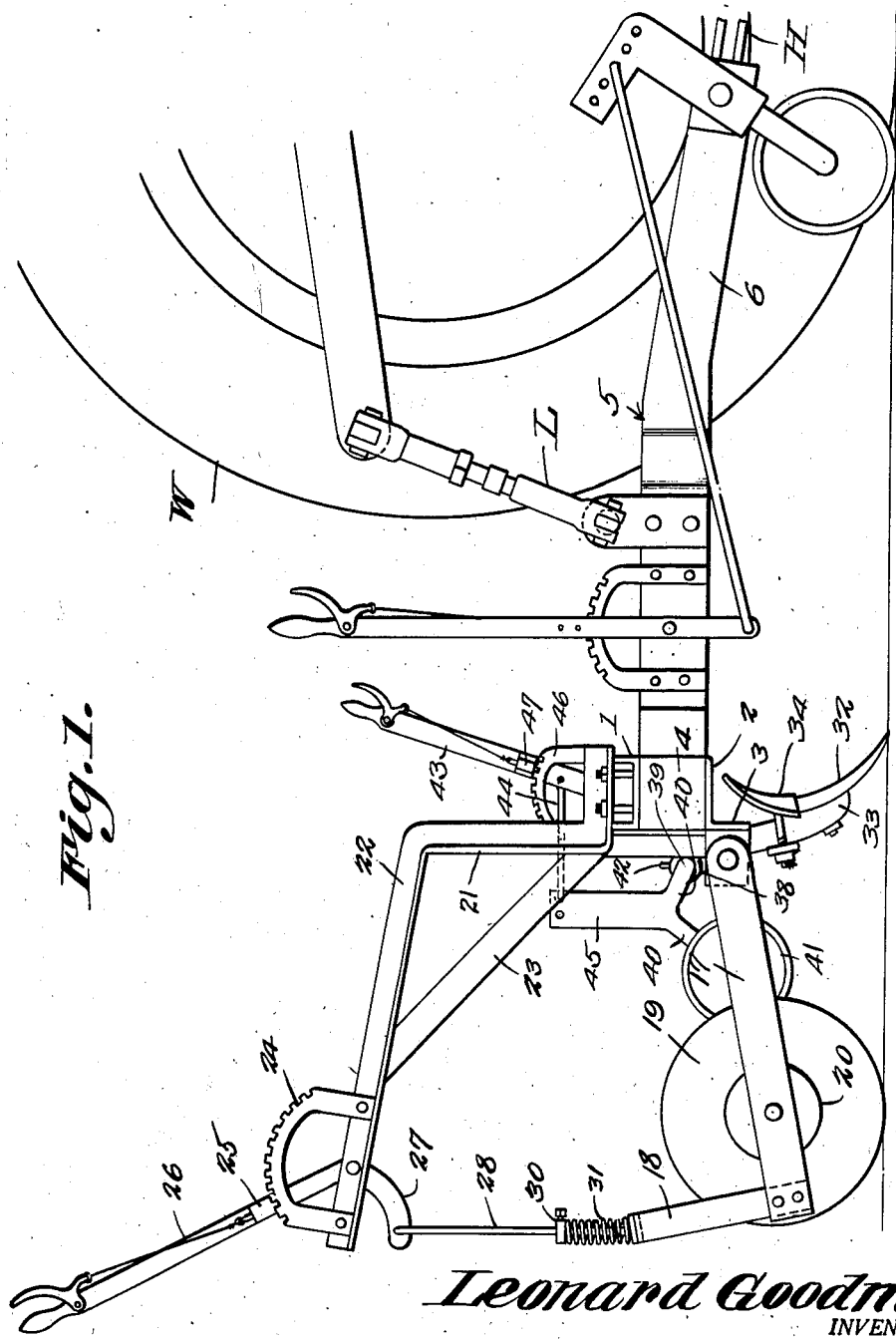
*Leonard Goodman*
INVENTOR

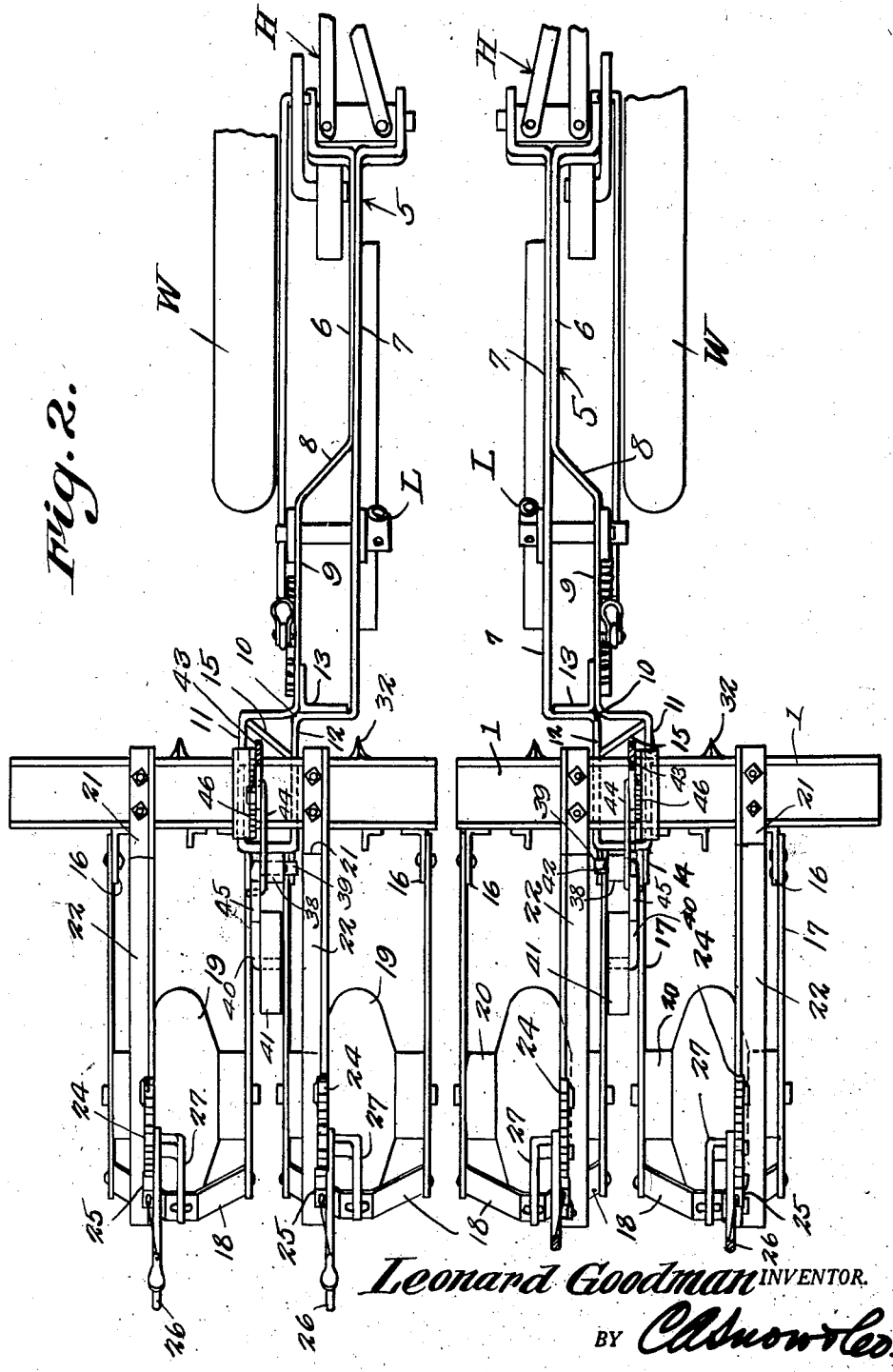

Nov. 24, 1942.  L. GOODMAN  2,303,043
DITCHER ATTACHMENT FOR TRACTORS
Filed Sept. 22, 1941  4 Sheets-Sheet 3
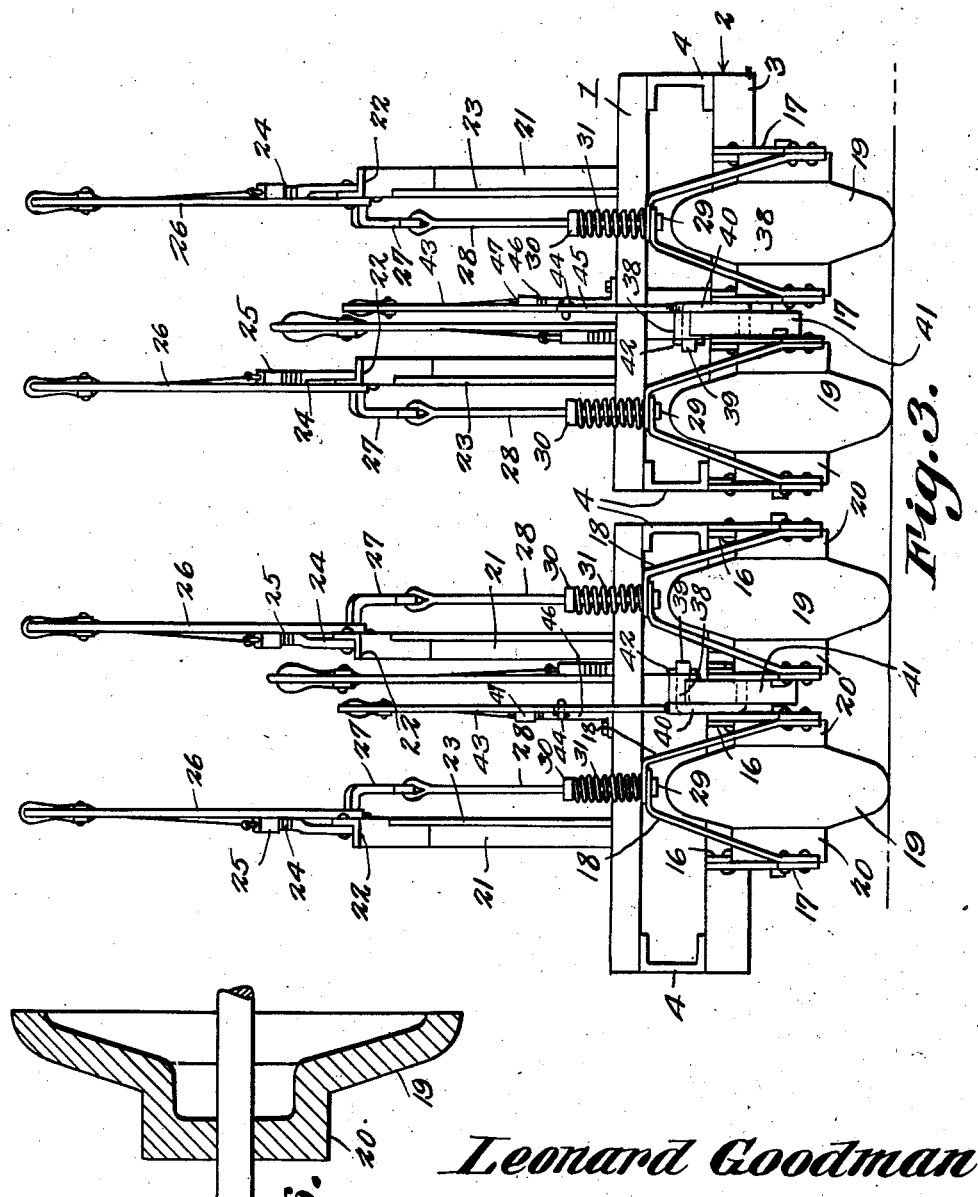
Leonard Goodman
INVENTOR.
BY Nov. 24, 1942.     L. GOODMAN     2,303,043
DITCHER ATTACHMENT FOR TRACTORS
Filed Sept. 22, 1941     4 Sheets-Sheet 4
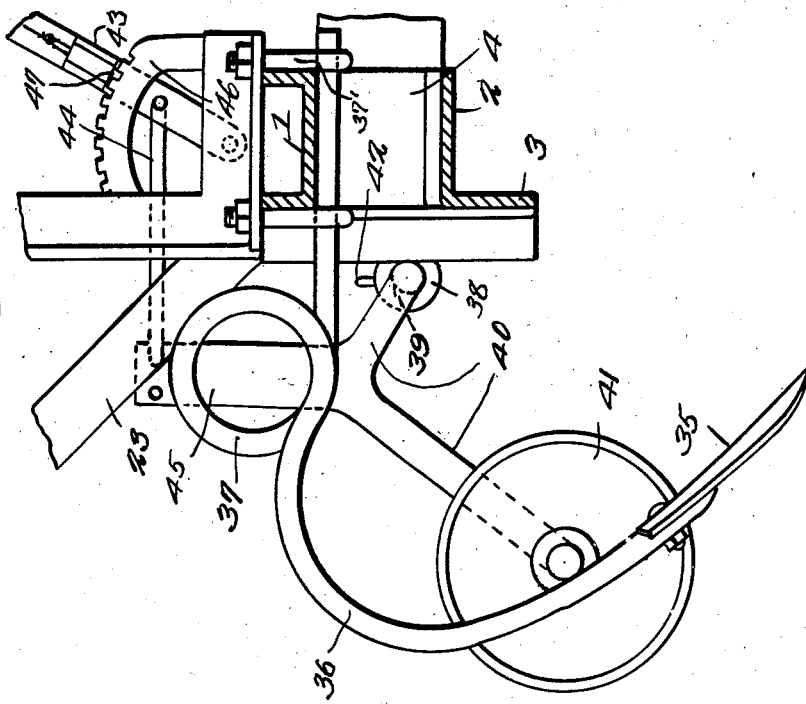
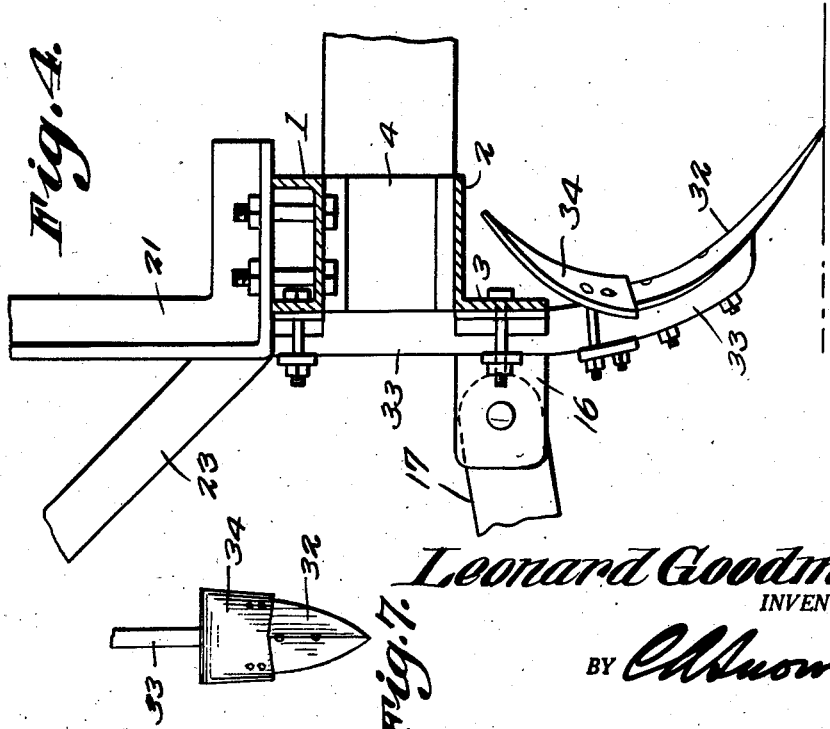
Leonard Goodman
INVENTOR.
BY Patented Nov. 24, 1942

2,303,043

UNITED STATES PATENT OFFICE 2,303,043

DITCHER ATTACHMENT FOR TRACTORS

Leonard Goodman, Yakima, Wash., assignor of one-half to Lucy R. Scudder, Yakima, Wash.

Application September 22, 1941, Serial No. 411,907

8 Claims. (Cl. 97—55)

This invention relates to a ditcher in the form of an attachment adapted to be connected to and drawn by any of the well known types of farm tractors.

One of the objects of the invention is to provide a ditcher utilizing rollers of new and novel construction which operate not only to pack the soil comprising the bottom and walls of the formed ditches but also to eliminate, the ridges heretofore left along the sides of the ditches and through which it has been necessary later for sickles to cut when harvesting crops.

Another object is to provide a frame so constructed as to hold the soil engaging elements of the device in raised position so that a short turn can be made, yielding means being employed to press said elements into the soil to an extent controlled by gauge devices.

A further object is to combine either plow or cultivator elements with the attachment whereby during one operation, ditches may be formed, objectionable growths removed from between the ditches, walls of the ditches packed, and the adjoining top surfaces of the ground flattened, so that the ground is thus prepared more quickly for use than has heretofore been possible.

Another object is to provide the structure with a frame which extends close to and back of the tractor wheels and so positions the soil engaging members relative to the tractor that the wheels of the latter will travel solely along lines extending between the ditches.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Figure 1 is a side elevation of the attachment.

Figure 2 is a plan view thereof.

Figure 3 is a rear elevation.

Figure 4 is a section through a portion of the attachment showing a ditcher shovel in position.

Figure 5 is a similar view showing the frame equipped with a cultivator tooth and gauge.

Figure 6 is an enlarged section through one-half of one of the rollers.

Figure 7 is a front elevation of the upper blade used with a cultivator tooth.

Referring to the figures by characters of reference I designates a channel beam forming the top member of the main frame and this member is above and parallel with an angle beam 2 forming the bottom member of the frame. Beam 2 includes a depending flange 3 along its back and the two beams are joined at their ends by interposed spacers 4 welded or otherwise joined thereto.

The frame is provided with a draft tongue 5 the forward portion of which is formed of parallel contacting metal strips 6 and 7, one of which, 6, diverges rearwardly from the strip 7, as at 8 and is then extended parallel with but spaced from strip 6, as at 9. At a point in front of but adjacent to the beams I and 2, strip 7 is bent at a right angle to meet the strip 6 at 10 and at this point strip 6 is bent laterally and thence rearwardly as at 11 while strip 7 is extended rearwardly as at 12. The two strips are rigidly joined at 10 by a welded or riveted angular tie plate 13 or the like and the parts 11 and 12 of the strips extend between the beams I and 2 adjacent to the centers of said beams and are joined thereto by welding or in other suitable manner. The portions 11 and 12 merge along a rear connecting portion 14 and the connecting frame formed by the parts 11, 12 and 14 can be reinforced as by an inserted brace 15 secured therein.

The forward portion of the tongue 5 can be joined to any type of tractor by any well known hitch H provided therefor so as to swing upwardly and downwardly relative thereto and the raising and lowering of the tractor can be effected by lifts L such as used on the well known types of cultivator attachments for tractors. Therefore it has not been deemed necessary to show and describe these particular parts in detail because they constitute no part of the present invention. Insofar as the draft means is concerned the improvements reside solely in the rear construction of the tongue as heretofore described whereby the center of the frame formed by beams I and 2 and their connections will be maintained directly back of one of the rear wheels W of the tractor.

Secured to and extending backwardly from the beam 2 are ears 16 arranged in pairs and to the ears of each pair are pivotally connected forward ends of a swinging frame comprising side strips 17 and rear upwardly converging members 18 rigidly connected thereto and to each other to form upstanding yokes. A tubular axle is mounted in the side strip 17 of each frame and provides a bearing for a roller of novel construction. This roller comprised two opposed cup-like castings 19 joined at their margins by welding or otherwise and having alined oppositely extended integral bosses 20 at their centers. Thus each pair of castings 19 forms a heavy roller elliptical in cross section proportioned to pack the bottom and walls of a formed ditch and having the extended bosses 20 designed to press down on and roll the top surface of the soil at the sides of the ditch, thereby to eliminate the side ridges usually left along the ditches.

Rigidly mounted on and extended upwardly from beam 1 above the rolls are standards 21 each of which is provided at its upper end with a rearwardly extended arm 22 which can be braced as at 23. Each arm overhangs one of the yokes 18 and carries a toothed segment 24 for engagement by a locking dog 25 on a hand lever 26. This lever has an arm 27 from which extends a lifting rod 28 which is slidable in the yoke 18 thereunder and has a head 29 for preventing its withdrawal from the yoke. A collar 30 is provided on the rod and a compression spring 31 is located on the rod between the collar and yoke.

Obviously by providing the described structure any or all of the rollers 19 can be swung upwardly out of contact with the ground to facilitate turning. Furthermore by swinging the arms 27 downwardly and locking their levers 26, the springs 31 can be placed under compression to force the rollers against the soil at any desired pressure. By raising and lowering the rollers by the means described and holding them in the positions to which they are moved, these rollers can be used to regulate the depth of penetration of the ditcher blades 32.

It is preferred to use two units such as herein described at the back of a tractor, one of the draft tongues being offset oppositely to the other so that the centers of the respective frames formed by beams 1 and 2 will be behind the wheels W. Thus the rollers 19 can be so located that the tractor wheels will travel between those ditches in which the rollers are located. Furthermore the number of rollers in each unit can be varied, it merely being necessary to locate them close to but at the sides of the paths of the wheels. The rollers can be placed desired distances apart to adapt them to the distances between the ditches.

In addition to the rollers each ditcher unit can be provided with other soil engaging members such as ditching shovels and cultivator teeth. Each ditcher shovel would be located in the path of a roller 19 and, as shown in Figures 1 and 4, can include a digging blade 32 carried by a standard 33 extending back and bolted to the flange 3. A deflecting blade 34 can be attached to the upper end of blade 32 and curved forwardly therefrom to prevent the loosened soil from riding upwardly over blade 32 and falling back into the formed ditch. This blade 32 will dig a ditch, as the device is drawn forwardly and the following roller will pack the walls of the ditch and the adjacent top surfaces of the soil as explained.

Cultivator teeth can be used to remove objectionable vegetation before the ditcher is brought into action. Under some conditions ordinary teeth can be used but it is preferred to connect teeth 35 to spring standards 36 each having an intermediate spring coil 37 and being extended under and clamped to beam 1, as shown in Figure 5. For the purpose of regulating the depth of penetration by these teeth each unit can be provided adjacent to its center with a laterally extended sleeve 38. Into this sleeve is insertible a finger 39 extending laterally from the upper end of an angular standard 40 and a gauge wheel 41 is journaled on the lower end of the standard. By means of a cotter pin 42 or the like extended through finger 39 the standard 40 can be held detachably.

A hand lever 43 is mounted on the main frame and connected by a link 44 to an arm 45 extending upwardly from the standard 40. A rack 46 and dog 47 are used to hold the lever when in any position. Thus the wheel 41 can be used as a gauge when teeth 35 are employed, thereby to regulate the depth to which they will penetrate in removing undesirable grasses, etc.

It is to be understood that when this machine is to be used for ditching purposes the wheels 41 carried thereby are raised well above the surface of the ground as shown in Fig. 1 and the teeth 35 are disconnected from the beam 1 by loosening or removing the bolts 37' ordinarily used for binding the forward portions of the standards 36 to the beam 1. With these teeth completely removed from the machine they will in no way interfere with the operation of the ditching mechanism. When the teeth 35 are to be used, it is first necessary to detach the standards 33 from the beams 1 and 2 and remove these standards and the blades 32 completely from the machine. The strips 17 of the frames-carrying rollers 19 can be raised to their uppermost positions where they will not interfere with the operation of the cultivator teeth or they can be removed bodily by disconnecting them from the ears 16 and from the arms 27 of levers 26.

In practice it has been found that by equipping a tractor with an attachment such as herein described a considerable saving of time and labor is effected as compared with the use of other means for performing the same service.

Obviously other attachments such as drag harrows, turning plows, etc., can be used with the present invention with or without the rollers. When the rollers are not to be used they can be raised and held well above the surface of the ground.

What is claimed is:

1. An attachment for farm tractors including a main frame, an offset draft tongue rigidly joined to the center thereof for engagement by a hitch, a hinged frame connected to and extending back from the frame, a roller rotatable in the frame, said roller being proportioned to compress the walls and bottom of a ditch and the adjacent top surface of the soil, and means carried by the frame for yieldingly depressing the roller.

2. An attachment for farm tractors including a main frame, an offset draft tongue rigidly joined to the center thereof for engagement by a hitch, a hinged frame connected to and extending back from the frame, a roller rotatable in the frame, said roller being proportioned to compress the walls and bottom of a ditch and the adjacent top surface of the soil, means for raising and lowering the hinged frame and roller relative to the main frame, and yielding means for depressing the roller while in its lowered position.

3. An attachment for farm tractors including a main frame, an offset draft tongue rigidly joined to the center thereof for engagement by a hitch, a hinged frame connected to and extending back from the frame, a roller rotatable in the frame, said roller being proportioned to compress the walls and bottom of a ditch and the adjacent top surface of the soil, and means carried by the frame for yieldingly depressing the roller, said roller comprising opposed cup-shaped members joined at their margins, and a central outwardly extended boss on each member.

4. An attachment for farm tractors including a main frame, a tongue rigidly connected to the center of the frame for up and down swinging movement relative to a hitch, said tongue having a laterally offset portion for positioning the center of the main frame behind a wheel of a tractor, a frame hingedly connected to the main frame, a ditcher blade on the main frame, a roller carried by the hinged frame and positioned to travel behind the ditcher, and means for raising and lowering the hinged frame and roller relative to the ditcher blade.

5. An attachment for farm tractors including a main frame, a tongue rigidly connected to the center of the frame for up and down swinging movement relative to a hitch, said tongue having a laterally offset portion for positioning the center of the main frame behind a wheel of a tractor, a frame hingedly connected to the main frame, a soil engaging blade carried by the main frame, a ditch packing roller in the hinged frame, and means for raising and lowering the hinged frame relative to the main frame.

6. An attachment for farm tractors including a main frame, a tongue rigidly connected to the center of the frame for up and down swinging movement relative to a hitch, said tongue having a laterally offset portion for positioning the center of the main frame behind a wheel of a tractor, a frame hingedly connected to the main frame, a soil engaging blade carried by the main frame, a ditch packing roller in the hinged frame, and means for raising and lowering the hinged frame relative to the main frame, said means including a compression spring and means for transmitting downward thrust through the spring to the roller.

7. An attachment for farm tractors including a main frame comprising an upper channel beam, a lower angle beam, rigid connections between the beams, a draft tongue having a laterally offset rear portion fixed between the beams at the centers thereof, and soil engaging elements connected to the frame at opposite sides of the center of the frame.

8. An attachment for farm tractors including a main frame comprising an upper channel beam, a lower angle beam, rigid connections between the beams, a draft tongue having a laterally offset rear portion fixed between the beams at the centers thereof, and soil engaging elements connected to the frame at opposite sides of the center of the frame, each of said elements including a hinged frame mounted for up and down swinging movement, a roller substantially elliptical in cross-section and having central opposed bosses, means for raising and lowering the hinged frame and compression means for exerting a yielding downward pressure on the roller.

LEONARD GOODMAN.